US006972533B2

(12) United States Patent
Jordison et al.

(10) Patent No.: US 6,972,533 B2
(45) Date of Patent: Dec. 6, 2005

(54) CONTROL OF A SWITCHED RELUCTANCE DRIVE

(75) Inventors: Ian Jordison, Harrogate (GB); Marielle Ghislaine Alberte Piron, Harrogate (GB); Peter Richard Mayes, Bradford (GB); Peter Murray, Ossett (GB); Michael James Turner, Leeds (GB); Michael Leo McClelland, Calverley (GB)

(73) Assignee: Switched Reluctance Drives Limited, Harrogate (GB)

( * ) Notice: Subject to any disclaimer, the term of this patent is extended or adjusted under 35 U.S.C. 154(b) by 103 days.

(21) Appl. No.: 10/623,207

(22) Filed: Jul. 18, 2003

(65) Prior Publication Data

US 2005/0077862 A1 Apr. 14, 2005

(30) Foreign Application Priority Data

Jul. 22, 2002 (GB) .................................... 0216990
Dec. 20, 2002 (GB) .................................... 0229841

(51) Int. Cl.[7] .................................................. H02P 1/18
(52) U.S. Cl. ...................... 318/254; 318/439; 318/138; 318/700; 318/701
(58) Field of Search ................................ 318/254, 138, 318/439, 700, 701, 721, 722, 432

(56) References Cited

U.S. PATENT DOCUMENTS

| | | | | |
|---|---|---|---|---|
| 5,469,039 | A | 11/1995 | Stephenson et al. | |
| 5,652,494 | A * | 7/1997 | Sugden | 318/701 |
| 5,724,477 | A | 3/1998 | Webster et al. | |
| 5,896,020 | A * | 4/1999 | Pyo | 318/701 |
| 6,107,764 | A * | 8/2000 | Blackburn | 318/254 |
| 6,157,160 | A * | 12/2000 | Okawa et al. | 318/701 |
| 6,577,087 | B2 * | 6/2003 | Su | 318/254 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

* cited by examiner

*Primary Examiner*—Rina Duda
(74) *Attorney, Agent, or Firm*—Dicke, Billig & Czaja, PLLC

(57) ABSTRACT

A switched reluctance drive, operating either as a motor or a generator, is controlled in a stable manner in the continuous current mode in the presence of supply voltage or electrical load variation. The use of a current control parameter $I_x$ in addition to the conventional on- and off-angles $\theta_{on}$, $\theta_{off}$ gives the ability to operate smoothly in the continuous current mode and to transition smoothly between operating modes. Once the phase current reaches a pre-determined level $I_x$, the phase winding may be placed in a freewheel state, thereby controlling the standing current in the phase winding and/or the output voltage.

13 Claims, 6 Drawing Sheets

CONTROL OF A SWITCHED RELUCTANCE DRIVE

CROSS-REFERENCE TO RELATED APPLICATION

The subject matter of this application is related to the subject matter of British Patent Application Nos. 0216990.2 and 0229841.2, filed Jul. 22, 2002 and Dec. 20, 2002 respectively, priority to both of which is claimed under 35 U.S.C. § 119 and both of which are incorporated herein by reference.

BACKGROUND OF THE INVENTION

1. Field of the Invention

This invention relates to the control of reluctance machines, particularly of switched reluctance machines.

2. Description of Related Art

The control and operation of switched reluctance machines generally are described in the paper "The Characteristics, Design and Applications of Switched Reluctance Motors and Drives" by J. M. Stephenson and R. J. Blake delivered at the PCIM'93 Conference and Exhibition held in Nurnberg, Germany, 21–24 Jun. 1993 and incorporated herein by reference. In that paper "chopping" and "single-pulse" modes of energization of switched reluctance machines are described for operation of the machine at low and high speeds respectively.

A typical prior art drive is shown schematically in FIG. 1. This includes a DC power supply 11 that can be either a battery or rectified and filtered AC mains. The DC voltage provided by the power supply 11 is switched across phase windings 16 of the motor 12 by a power converter 13 under the control of the electronic control unit 14. Some form of current transducer 18 is normally provided to give phase current feedback. The motor 12 is connected to a load 19.

One of the many known converter topologies is shown in FIG. 2. The phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A low-value resistor 28 is connected in series with the lower switch 22 to act as a current-sense resistor and provide a current feedback signal. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter.

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which co-operates with an optical or magnetic sensor mounted on the stator. A pulse train indicative of rotor position relative to the stator is generated and supplied to control circuitry, allowing accurate phase energization. Alternative methods of position detection include the so-called "sensorless" methods, in which the position is deduced from measurements of another parameter of the machine.

At low speeds, switched reluctance systems generally operate in a current-controlled or "chopping" mode, as illustrated generally in FIGS. 3(*a*)–3(*b*) for motoring. A hysteresis current controller using "hard" chopping is often used, as shown in FIG. 3(*a*). Typically, the voltage is applied to the phase at an angle $\theta_{on}$ in the minimum inductance region and the current rises rapidly until an upper bound $I_u$ is reached, whereupon the switches are opened and the full reverse voltage is applied across the winding by the action of the diodes 23, 24, driving down the flux and hence the current. When a lower bound $I_l$ is reached, the switches are then closed and the current rises again. The cycle is repeated until the switch-off angle $\theta_{off}$ is reached, typically at the point of maximum inductance when the rotor poles are fully aligned with the stator poles. The current is then forced down to zero by the reverse voltage. The current remains at zero until the cycle begins again at $\theta_{on}$, so the mark:space ratio of the current is approximately 0.5.

An alternative regime, known as "soft" chopping, is illustrated in FIG. 3(*b*) in which only one switch, e.g. switch 21, is opened when the current reaches its upper bound, the current then decaying much more slowly through the winding, the second switch 22 and one diode 24. The resulting reduction in switching frequency is often beneficial in reducing switching loss in the switches and reducing acoustic noise. Other types of current controllers are well known in the art, for example off-time controllers, constant frequency controllers, etc., and will not be described here. Their common characteristic, however, is that they all limit the current to a safe level to prevent damage to the switches and/or the machine.

At higher speeds, switched reluctance systems typically operate in the "single-pulse" mode of energization. This mode is illustrated in FIG. 4 in which the current and linearized inductance waveforms are shown over a phase inductance period. The current rises when the voltage is applied to the phase winding at the switch-on angle $\theta_{on}$, reaches a peak and then rolls over as the rotor poles begin to overlap the stator poles and the inductance rises. The current is limited naturally by the back emf of the circuit. The voltage is reversed at $\theta_{off}$ and the current falls at a faster rate as energy is returned to the supply and ceases when it reaches zero. There is then a period of zero current before the cycle begins again.

An alternative switching strategy uses freewheeling for an angle $\theta_f$ before $\theta_{off}$, whereby the switching circuit allows the current to re-circulate in the phase winding without an applied voltage. FIG. 5 illustrates this technique and the period of zero applied voltage during freewheeling is clearly shown. Again, the current falls to zero for a time before the cycle repeats.

Thus systems generally use a chopping mode at low speeds and a single-pulse mode at higher speeds. The parameters $I_u$ and $I_l$ (used in the chopping mode) are normally set to values above the expected peak current of the single pulse mode, so that these parameters do not interfere with single-pulse operation. It is known to set the parameter $I_u$ to a value which would act as a "safety net" so that if a fault condition developed in the drive the current would reach $I_u$ and chopping action would then limit the phase current to a safe, if undesired, value.

A special mode of operation of switched reluctance machines is the continuous current mode, as disclosed in U.S. Pat. No. 5,469,039 (Stephenson), which is incorporated herein by reference. In this mode, the winding is re-connected to the supply before the flux, and hence the current, have returned to zero at the end of the energy return period. The phase windings therefore operate with current continuously flowing through them and are always linked by flux. Although previously considered to be so unstable as to be unusable, U.S. Pat. No. 5,469,039 discloses a method of operating in a stable manner in this region so that steady state operation is possible. FIG. 6 shows a steady-state current waveform in motoring, where the current variation is quasi-sinusoidal above a "standing" value $I_s$. This is an important mode for systems which have to produce high levels of overload output at some points of their operating cycle. Although the efficiency of the drive falls in this mode, it allows specifications to be achieved which would otherwise require a larger machine.

While motoring operation has been illustrated in the above discussions, it is well-known that the machines operate equally well in the generating mode, in which the current waveforms are generally mirror images of the motoring waveforms.

The parameters of $\theta_{on}$, $\theta_{off}$, $I_u$, $I_l$, $\theta_f$, etc., are generally functions of speed and are either computed in real time or, more commonly, stored in some form of table from which they can be read at appropriate times. The parameter values are carefully chosen in order to achieve smooth output from the machine as the speed changes. If the stored values are relatively sparse, some form of interpolation is used to give suitable parameter values at intermediate speeds. There is a particular difficulty in choosing values at the transition points between chopping and single-pulse modes, and between single-pulse and continuous current modes, where a smooth transition is desired regardless of the torque level demanded.

One solution to this problem at the transition of the chopping and single-pulse modes is to use the current control parameters as the main variable. Whereas the current level is generally held constant with speed for a given torque demand throughout the chopping range, as the speed rises to the single-pulse mode it is known to raise the upper bound $I_u$ gradually (and sometimes the lower bound $I_l$ by corresponding amounts) so that the waveform gradually changes from that of, say FIG. 3(*a*) to that of FIG. 4. Once the machine has reached a speed where the current never reaches the upper current bound, the current control parameters are generally set to a high value so that they do not come into play for the rest of the speed range.

No such solution is available for the transition from single-pulse to continuous current, and careful selection of parameters is generally relied on to give a smooth transition. It is a feature of the continuous current mode that the sensitivity to angle parameters (particularly to the total conduction angle $\theta_c$, which is the angular difference between $\theta_{on}$ and $\theta_{off}$) is much higher than in single-pulse mode, so small differences in parameter value can produce undesirably large variations in output.

Most variable speed drive systems have to operate over a range of supply voltages and in some cases (typically those drives operating in remote areas or from an isolated power source), that range is a very significant fraction of the nominal supply voltage. While this is generally not a serious difficulty for switched reluctance systems in the chopping mode (since the current controller is generally capable of coping with the changing current gradients), it becomes a problem in single-pulse and continuous current modes, where the torque is strongly dependent on the supply voltage. Known attempts to solve this problem include the storing of a complete set of control parameters for a range of supply voltages (i.e. introducing a further parameter, supply voltage, into the set), but this often creates unacceptable demands on storage space in the controller.

In single-pulse mode, methods of voltage compensation have been developed which cope with this variation of supply voltage. For example, U.S. Pat. No. 5,724,477 (Webster), incorporated herein by reference, discloses a method of modifying the speed signal so as to arrive at a set of control parameters which efficiently produce the demanded torque. Other methods of voltage compensation are known for use in the single-pulse mode.

In the continuous current mode, however, these methods are seldom satisfactory. If, for example, the machine is operating just above the transition from single-pulse to continuous current and the supply voltage then rises, use of a voltage compensation scheme such as that disclosed in U.S. Pat. No. 5,724,477 is likely to generate control parameters which immediately drop the machine out of continuous current. The developed torque then immediately falls, leading to a drop in speed. If the drive is in speed control, the torque error rapidly rises to compensate, which then generates new control parameters which force the system back into continuous current mode. This sequence produces significant disturbance in the torque output, which can lead to the build up of oscillations and/or other instability.

In the single-pulse mode, the developed torque is largely independent of the winding resistance (except perhaps in the smallest of machines or those operating at very low voltages). As the machine experiences changes in load, the winding temperature, and hence winding resistance, changes but the output of the machine is effectively independent, thus allowing the use of control parameters which are unaffected by winding resistance. In continuous current, however, the current is a strong function of the system resistance so, for given control parameters, the output fluctuates with the thermal state of the winding. Even if reliable thermal feedback from the winding were available at a reasonable cost, providing control parameters which compensated for temperature would place an unacceptable burden on storage in the controller.

It is therefore clear that there is a need for a method of control in the continuous current mode which is able to compensate for varying supply voltage and changes in winding temperature and also give a smooth transition from and to the single-pulse mode, for example.

SUMMARY OF THE INVENTION

In accordance with a first aspect of the invention there is provided a method of controlling a switched reluctance machine in continuous current mode of operation, the switched reluctance machine comprising a rotor having a plurality of poles, a stator having a plurality of poles and at least one phase winding, the method comprising generating a first signal when the rotor reaches a first pre-determined position, which first signal causes a voltage to be applied to the phase winding, and generating a second signal when the phase current in the phase winding reaches a first pre-determined level, which second signal causes the phase winding to freewheel, thereby controlling the output of the machine. The phase winding freewheels for at least part of the remainder of the conduction angle of the phase winding. In the motoring mode this tends to control the standing current in the phase winding and in generating mode this tends to control the output voltage of the machine.

The method may also comprise generating a third signal, which third signal causes reversal of the voltage on the phase winding. This third signal may be generated when the rotor reaches a second pre-determined position or when the phase current in the phase winding reaches a second pre-determined level higher than the first. Alternatively, the third signal may be generated when the first of the following two conditions is met: the rotor reaches a second pre-determined position or the phase current in the phase winding reaches a second pre-determined level higher than the first.

The first pre-determined level of phase current in the phase winding is set to be below an expected peak current of the phase winding which would otherwise occur and/or the second pre-determined level of phase current in the phase winding is set to be above an expected peak current of the phase winding, according to aspects of the invention.

According to a further aspect of the invention there is provided a control device for use in controlling the operation of a switched reluctance machine comprising a rotor having a plurality of poles, a stator having a plurality of poles and at least one phase winding, the control device comprising an input for receiving an angular position signal from position sensing means, said angular position signal being indicative of the angular position of the rotor with respect to the stator, an input for receiving a phase current signal indicative of the current in a phase winding, an output to output a control signal to a switching arrangement, and a processor arranged to monitor the signals received at the inputs and to generate the control signal, wherein the processor is arranged to generate a first control signal when the angular position signal indicates that the rotor is at a first pre-determined position, which first signal causes a voltage to be applied to the phase winding, and generate a second control signal when the phase current signal indicates that current in the phase winding is at a first pre-determined level, which second signal causes the phase winding to freewheel, thereby controlling the standing current in the phase winding.

The processor is further arranged to generate a third signal, which third signal causes reversal of the voltage on the phase winding, according to an aspect of the invention. The third signal may be generated when the rotor reaches a second pre-determined position or when the phase current in the phase winding reaches a second pre-determined level higher than the first. Alternatively the processor may be further arranged to generate a third signal, which third signal causes reversal of the voltage on the phase winding, when the first of the following two conditions is met: the rotor reaches a second pre-determined position or the phase current in the phase winding reaches a second pre-determined level higher than the first. The first pre-determined level of phase current in the phase winding is set to be below the expected peak current of the phase winding and/or the second pre-determined level of phase current in the phase winding is set to be above the expected peak current of the phase winding, according to aspects of the invention.

According to another aspect of the invention there is provided a control system for use with a switched reluctance machine comprising a rotor having a plurality of poles, a stator having a plurality of poles and at least one phase winding, the control system comprising: a switching arrangement, position sensing means for generating an angular position signal indicative of the angular position of the rotor with respect to the stator, a current sensor for generating a phase current signal indicative of the phase current in a phase winding, and a control device, operatively coupled to the switching arrangement, the position sensing means and the current sensor, and arranged to receive the angular position signal and the phase current signal and to output a control signal to the switching arrangement, wherein the control means is arranged, in a continuous current mode of operation, to generate a first control signal when the angular position signal indicates that the rotor is at a first pre-determined position, which first signal causes a voltage to be applied to the phase winding, and to generate a second control signal to actuate the switching arrangement when the phase current reaches a predetermined threshold and so cause the phase winding to freewheel, thereby controlling the standing current in the phase winding.

BRIEF DESCRIPTION OF THE DRAWINGS

The invention can be put into practice in a number of ways, some of which will now be described by way of example and with reference to the accompanying drawings in which.

DETAILED DESCRIPTION OF PREFERRED EMBODIMENTS

The phase inductance cycle of a switched reluctance machine is the period of the variation of inductance for the, or each, phase; for example the period between maxima when the rotor poles and the relevant respective stator poles are fully aligned. The illustrative embodiments to be described use a 3-phase switched reluctance drive, but any number of phases could be used, with the machine in either motoring or generating mode.

The method of control according to aspects of the invention uses a combination of switch-on angle, switch-off angle and current level to trigger an optional period of freewheeling which controls the standing current, $I_s$, in the phase. Unlike previous methods of control in the continuous current mode, this method allows smooth control of the standing value of current with no abrupt dropping out of continuous current.

Figure 7:
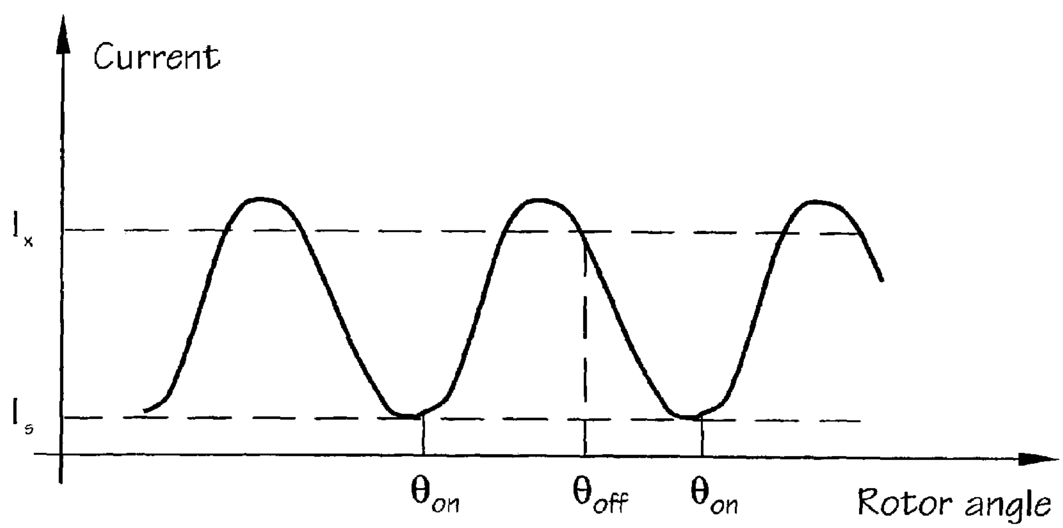
FIG. 7 shows a current waveform of the machine operating according to one aspect of the invention.

FIG. 7 shows a set of control parameters chosen according to embodiments of the invention. In operation, the phase is switched on at $\theta_{on}$ in the usual way. A current level $I_x$ is chosen, the value of which is a little below the natural peak current of the phase. The control system is arranged so that, when the phase current reaches $I_x$, the phase is put into freewheel until the switch-off angle $\theta_{off}$ is reached (i.e. for the remainder of the conduction angle of the phase), at which point the control becomes conventional, with both switches off. Contrary to expectation, this does not make a significant change to either the peak current or the shape of the waveform. Instead, it allows control of the level of standing current: varying $I_x$ by a small amount gives a corresponding variation in $I_s$.

This unexpected result has significant benefits in control. If the supply voltage now increases or the resistance of the winding decreases due to a fall in temperature, the phase current rises faster and reaches $I_x$ more quickly, effectively giving a shorter on time and a longer freewheel time, thus generally preventing an increase in the standing current $I_s$ and stabilizing the system. Conversely, a decrease in supply voltage or an increase in resistance gives a slower rise in current, increasing the on time and decreasing the freewheel time and generally preventing the standing current from falling. It is the combination of angle and current parameters which enables this to be achieved.

There are further benefits with this method of control in that it reduces the requirement for fine resolution of the conduction angle. It has previously been held that very fine resolution of this parameter is required for successful control in the continuous current mode, since the sensitivity of output to conduction angle is high in this mode. However, this can be costly to achieve since, for example, the cost of a position resolver is very dependent on its resolution. Indeed, in some systems, the amount of continuous current which can be employed is severely limited by the degree of control available on the angle parameters. Embodiments of this invention, however, allow the use of a current parameter, which is easily controlled with fine resolution, to effectively "fill in" load points between steps in the angle parameters.

Figure 8:
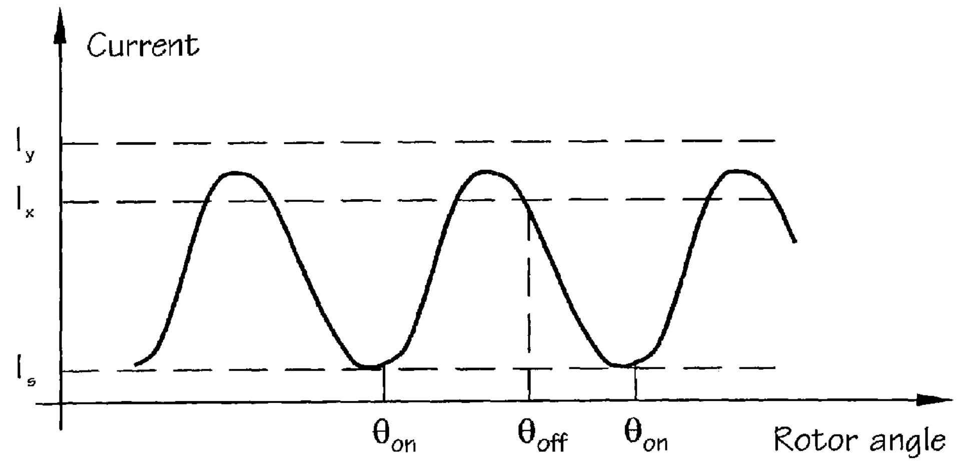
FIG. 8 shows a current waveform of the machine operating according to another aspect of the invention.

A variation of the method is to have two current parameters, as shown in FIG. 8. The second parameter, $I_y$, is set above $I_x$ and the expected peak current of the waveform. In operation, if the current rises significantly in freewheeling (i.e. after $I_x$ has been reached) because, say, generation is taking place, then $I_y$ can be used to switch off the second switch, effectively advancing the $\theta_{off}$ parameter. Thus the phase does not freewheel for all of the remainder of the conduction angle of the phase. The phase freewheels for a fraction of the remainder of the conduction angle of the phase.

When implementing embodiments of the invention, it is generally advantageous to characterize the machine at nominal voltage and average temperature rise. This allows $I_x$ to be chosen to accommodate both rise and fall of voltage and temperature. It is also advantageous to characterize the points before the entry to continuous current with $I_x$ set a little bit above the natural peak current, so that when the voltage rises and the machine would otherwise abruptly enter continuous current, the presence of the current control $I_x$ will soften the entry and stabilize the system.

Figure 1:
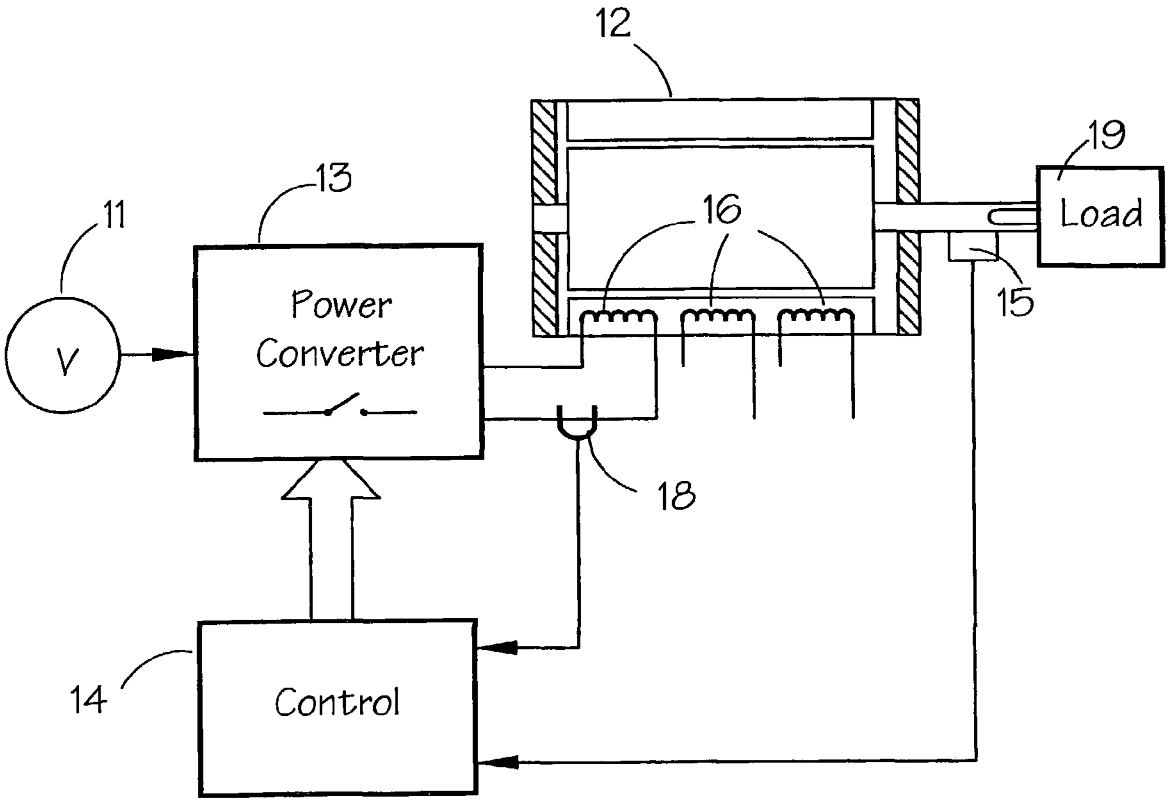
FIG. 1 shows a typical prior art switched reluctance drive.
Figure 2:
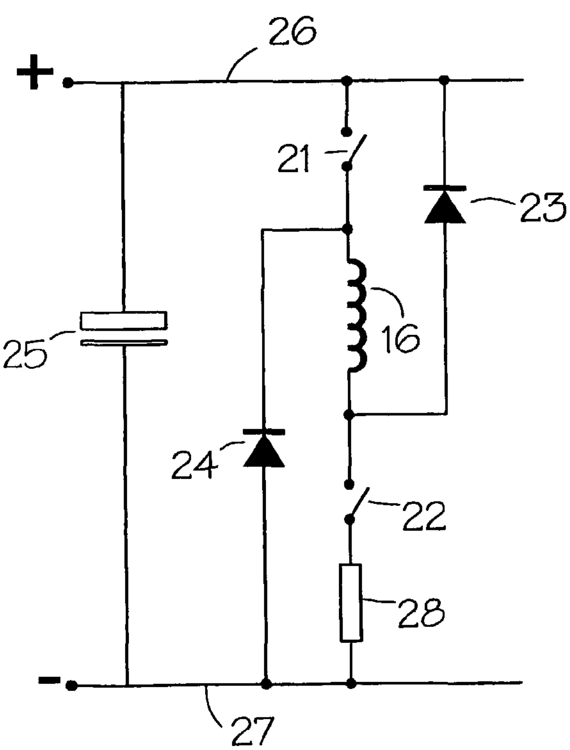
FIG. 2 shows a known topology of one phase of the converter of FIG. 1.
Figure 3A:
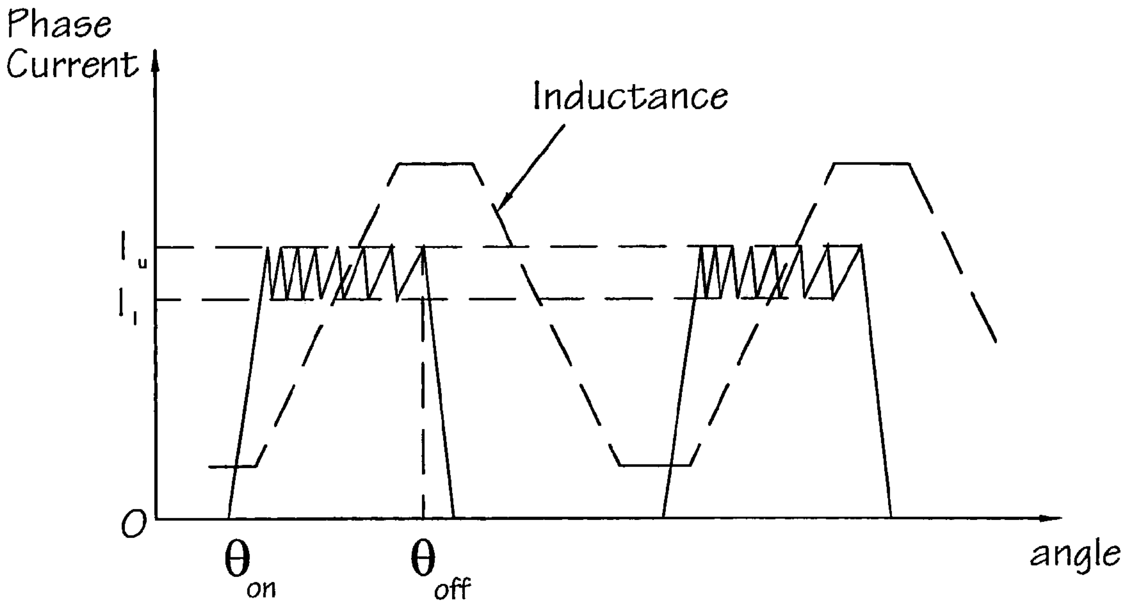
FIG. 3(*a*) and FIG. 3(*b*) show typical chopping control waveforms.
Figure 3B:
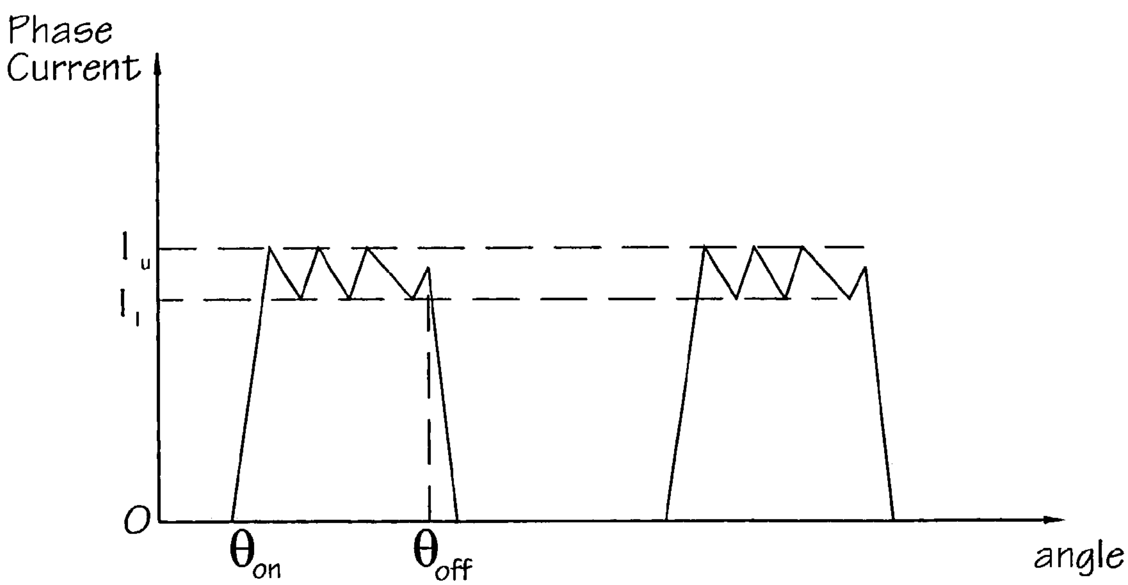
Figure 4:
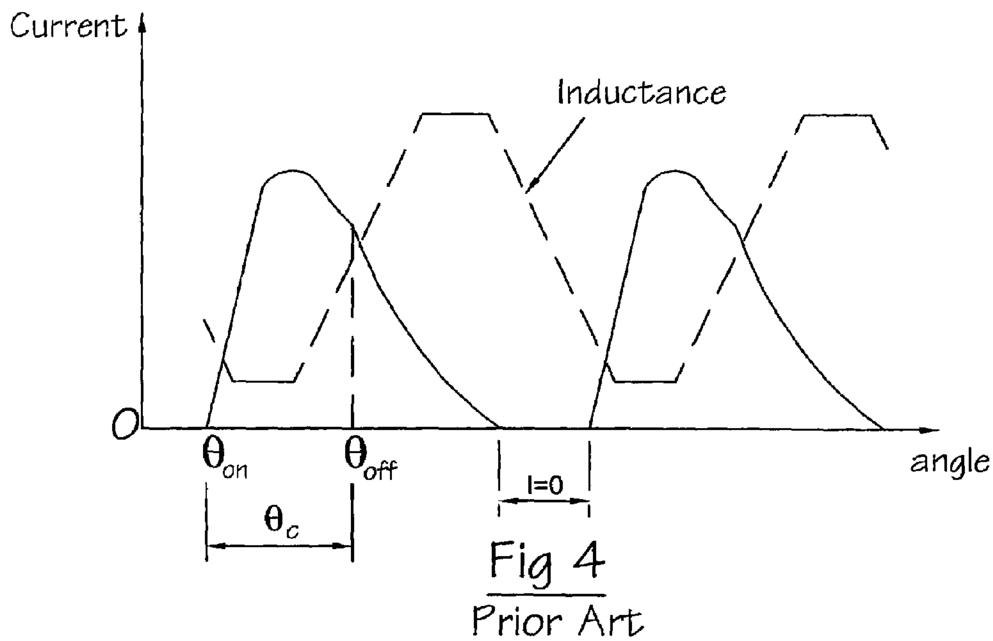
FIG. 4 shows a typical current waveform in single-pulse control.
Figure 5:
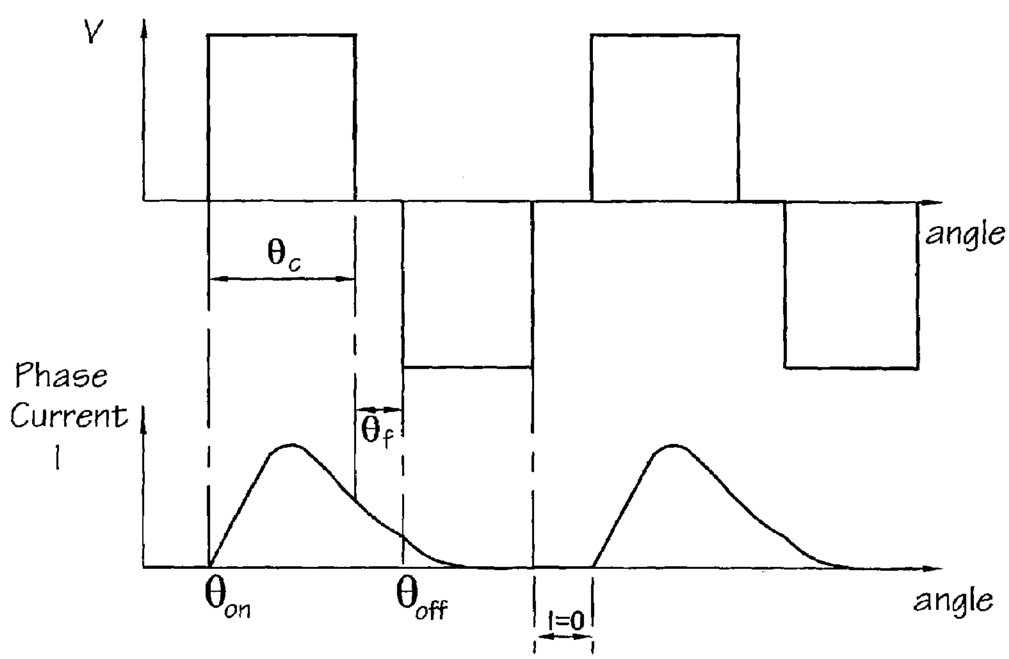
FIG. 5 shows a typical current waveform in single-pulse control using freewheeling.
Figure 6:
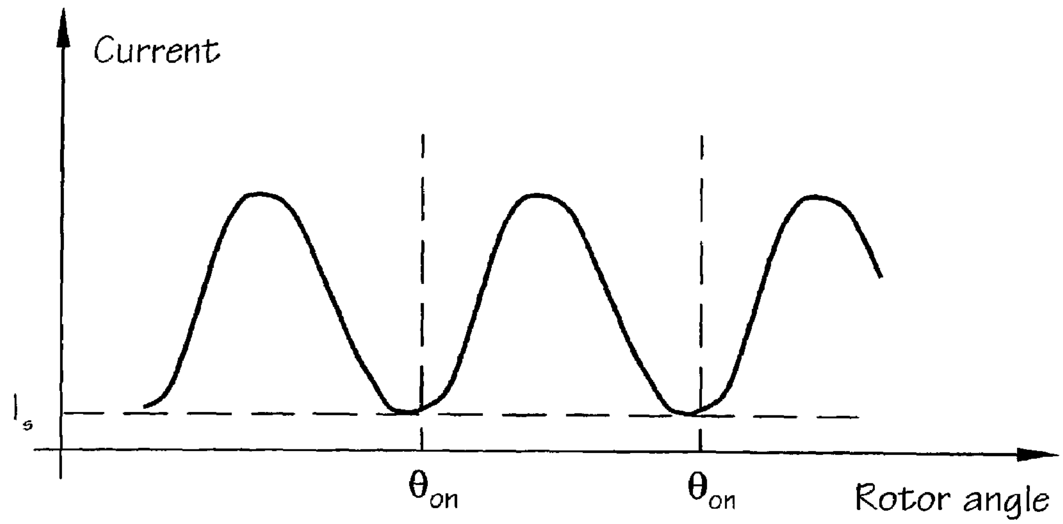
FIG. 6 shows a typical current waveform in continuous current mode.

A further embodiment of the invention will be described, which is particularly useful when the machine is operating in the generating mode. When operating in generating mode, the speed of the machine is generally constant, or at least varies only slowly, since the inertia of the mechanical arrangement is usually dominated by the prime mover. Unless the system is generating onto a "stiff" supply, the voltage is controlled principally by the electrical load and the rating of the dc link capacitor(s) (i.e. capacitor 25 in FIG. 2). If there is a sudden change in the electrical load, e.g. the so-called "load dump" situation when at least part of the load is disconnected suddenly, then, unless the control system can react quickly, there will be a corresponding voltage swing on the dc link. This is undesirable from the point of view of the remaining load(s) and, if it is an upwards voltage swing, of the dc link capacitors, which may fail catastrophically on serious over-voltage. If the machine is operating in chopping or single-pulse mode, the bandwidth of the control system is generally sufficient to control the transient by modifying the control angles. However, if the machine is operating in continuous current mode, the response is necessarily much slower, since it takes many cycles for the standing current to reach a new steady-state value.

Figure 9:
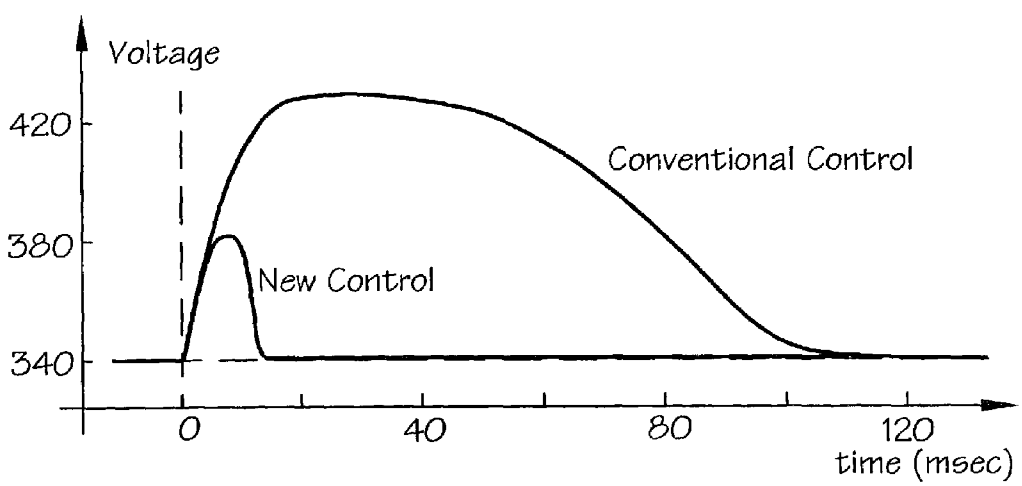
FIG. 9 shows the recovery time of a generator subject to a load dump.

This is illustrated in FIG. 9, which shows the voltage output of a switched reluctance generator, rated at 10 kW, operating at a speed of 3600 rpm. Before t=0 the generator is supplying 10 kW to a load and the voltage is steady at its rated value of 340V. At t=0, the load is suddenly removed and, under conventional P+I control, the voltage swings up to 428V (i.e. +19%) and takes around 200 msec to recover. While increasing the gains of the controller may help to reduce these excursions, too high a gain will in itself cause instability.

Applying embodiments of the invention to this situation by controlling the on-angle and a current parameter shows an immediate benefit, as seen in FIG. 9, where the overshoot is reduced to 385V and the recovery time reduces to 12 msec. It will be appreciated that the energy in the transient has been reduced to around 4% of the previous case, greatly reducing unwanted side effects.

It will be appreciated that the same principles apply for the smaller transients caused by smaller changes in load. They also apply to a sudden increase in load, which would lead to a negative swing in the output voltage.

Figure 10:
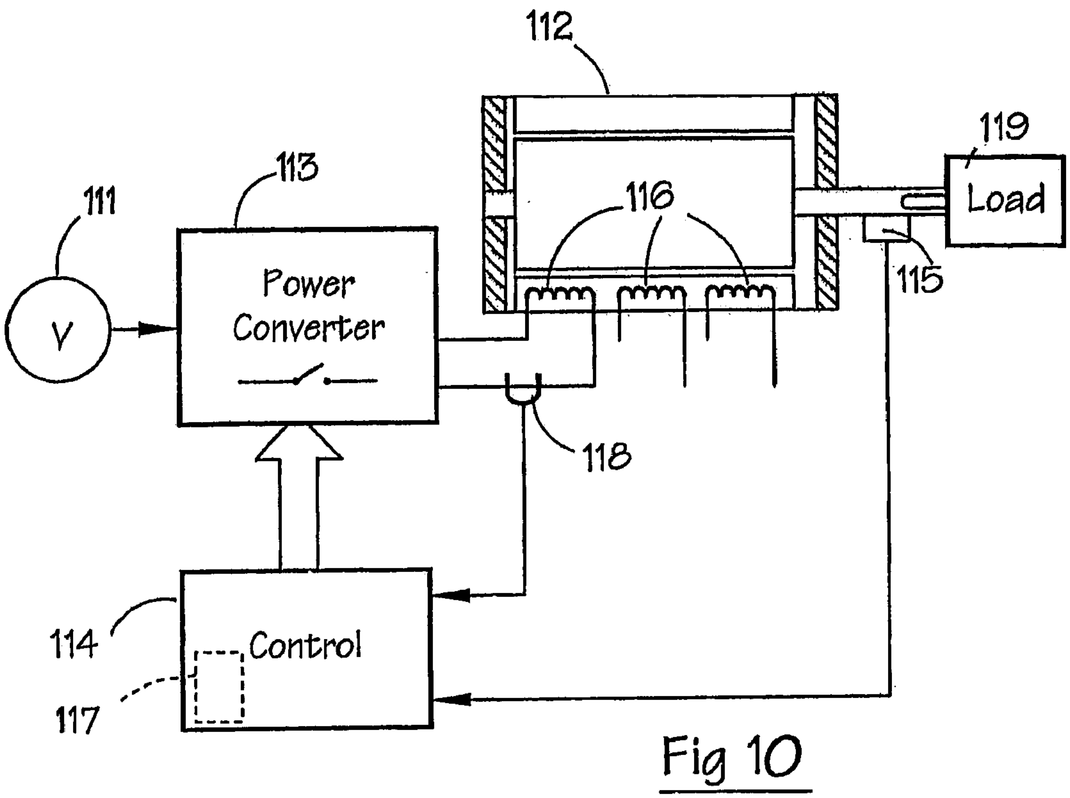
FIG. 10 shows a switched reluctance drive according to one aspect of the invention.

A drive according to an embodiment of the invention is shown schematically in FIG. 10. This includes a DC power supply 111 that can be either a battery or rectified and filtered AC mains. The DC voltage provided by the power supply 111 is switched across phase windings 116 of the drive 112 by a power converter 113 under the control of the electronic control unit 114 having processor 117. Detection of rotor position is achieved using transducer 115, which is an example of position sensing means. Current transducer 118 is provided to give phase current feedback. The drive 112 is connected to a load 119.

The skilled person will appreciate that variations of the disclosed arrangements are possible without departing from the invention, for example in the details of the implementation of the algorithm in the microprocessor. Accordingly, the above description of several embodiments is made by way of example and not for the purposes of limitation. It will be clear to the skilled person that minor modifications can be made to the drive circuit without significant changes to the operation described above. The present invention is intended to be limited only by the scope of the following claims.

What is claimed is:

1. A method of controlling a switched reluctance machine in continuous current mode of operation, the switched reluctance machine comprising a rotor and a stator having at least one phase winding, the method comprising:

generating a first signal when the rotor reaches a first pre-determined position, which first signal causes a voltage to be applied to the phase winding, and generating a second signal when the phase current in the phase winding reaches a first pre-determined level, which second signal causes the phase winding to freewheel, thereby controlling the output of the machine.

2. A method according to claim 1 further comprising:

generating a third signal, which third signal causes reversal of the voltage on the phase winding, when the rotor reaches a second pre-determined position.

3. A method according to claim 1 further comprising:
generating a third signal, which third signal causes reversal of the voltage on the phase winding, when the current in the phase winding reaches a second pre-determined level higher than the first.

4. A method according to claim 1 further comprising:
generating a third signal, which third signal causes reversal of the voltage on the phase winding, when the first of the following two conditions is met: the rotor reaches a second pre-determined position or the current in the phase winding reaches a second pre-determined level higher than the first.

5. A method according to claim 1 wherein the first pre-determined level of phase current in the phase winding is set to be below the expected peak current of the phase winding.

6. A method according to claim 3 wherein the second pre-determined level of phase current in the phase winding is set to be above the expected peak current of the phase winding.

7. A control device for use in controlling the operation of a switched reluctance machine in continuous current mode of operation comprising a rotor and a stator having at least one phase winding, the control device comprising:
an input for receiving an angular position signal from position sensing means, said angular position signal being indicative of the angular position of the rotor with respect to the stator,
an input for receiving a phase current signal indicative of the current in a phase winding,
an output to output a control signal to a switching arrangement, and
a processor arranged to monitor the signals received at the inputs and to generate the control signal,
wherein the processor is arranged to generate a first control signal when the angular position signal indicates that the rotor is at a first pre-determined position, which first signal causes a voltage to be applied to the phase winding, and to generate a second control signal when the phase current signal indicates that current in the phase winding is at a first pre-determined level, which second signal causes the phase winding to freewheel, thereby controlling the standing current in the phase winding.

8. A control device according to claim 7 wherein the processor is further arranged to generate a third signal, which third signal causes reversal of the voltage on the phase winding, when the rotor reaches a second pre-determined position.

9. A control device according to claim 7 wherein the processor is further arranged to generate a third signal, which third signal causes reversal of the voltage on the phase winding, when the current in the phase winding reaches a second pre-determined level higher than the first.

10. A control device according to claim 7 wherein the processor is further arranged to generate a third signal, which third signal causes reversal of the voltage on the phase winding, when the first of the following two conditions is met: the rotor reaches a second pre-determined position or the current in the phase winding reaches a second pre-determined level higher than the first.

11. A control device according to claim 7 wherein the first pre-determined level of current in the phase winding is set to be below the expected peak current of the phase winding.

12. A control device according to claim 9 wherein the second pre-determined level of current in the phase winding is set to be above the expected peak current of the phase winding.

13. A control system for use with a switched reluctance machine comprising a rotor and a stator having at least one phase winding, the control system comprising:
a switching arrangement,
position sensing means for generating an angular position signal indicative of the angular position of the rotor with respect to the stator,
a current sensor for generating a phase current signal indicative of the current in a phase winding, and
control means, operatively coupled to the switching arrangement, the position sensing means and the current sensor, for receiving the angular position signal and the phase current signal and for outputting a control signal to the switching arrangement,
wherein the control means is arranged, in a continuous current mode of operation, to generate a first control signal when the angular position signal indicates that the rotor is at a first pre-determined position, which first signal causes a voltage to be applied to the phase winding, and to generate a second control signal to actuate the switching arrangement when the phase current reaches a predetermined threshold and so cause the phase winding to freewheel, thereby controlling the standing current in the phase winding.

* * * * *